United States Patent [19]

Smith

[11] 3,841,506
[45] Oct. 15, 1974

[54] TOW TRAILER FOR VEHICLES

[75] Inventor: William M. Smith, Kewanee, Ill.

[73] Assignee: Redy-Tow, Inc., Evanston, Ill.

[22] Filed: Nov. 10, 1972

[21] Appl. No.: 305,480

[52] U.S. Cl. .............................. 214/86 A, 280/402
[51] Int. Cl. ............................................ B60p 3/12
[58] Field of Search .................... 214/86 A; 280/402

[56] References Cited
UNITED STATES PATENTS

| | | | |
|---|---|---|---|
| 2,615,538 | 10/1952 | Pelaez | 214/86 A |
| 2,701,069 | 2/1955 | Hawkins | 214/86 A |
| 2,864,584 | 12/1958 | Guerard | 214/86 A |
| 3,522,892 | 8/1970 | Vegors | 214/86 A |
| 3,620,393 | 11/1971 | Bubik | 214/86 A |
| 3,720,330 | 3/1973 | Forse et al. | 214/86 A |

*Primary Examiner*—Robert J. Spar
*Assistant Examiner*—Donald W. Underwood
*Attorney, Agent, or Firm*—Hill, Gross, Simpson, Van Santen, Steadman, Chiara & Simpson

[57] ABSTRACT

A tow trailer unit for easy coupling to the rear of a standard automobile or truck to hoist and support one end of a second vehicle. The unit has a main frame or chassis with a standard hitch at its front end, a pair of self tracking interconnected dirigible wheels suspended from its rear end, a lift frame pivoted at its rear end suspending belts and chains for anchoring to the front end of the second vehicle, and hoist mechanism for swinging the lift frame from a rearwardly extended lower position to an upright position. Support struts pivoted on the main frame connect with the lift frame in its upright position to cooperate with the main frame in forming a triangular fixed supporting frame for the second vehicle. The unit may include a cable winch mechanism, a detachable boom usable to provide a lifting derrick, and a supplemental wheeled frame attachment to project rearwardly from the main frame under the boom to provide support for the weight lifted by the boom.

15 Claims, 12 Drawing Figures

3,841,506
Fig. 1
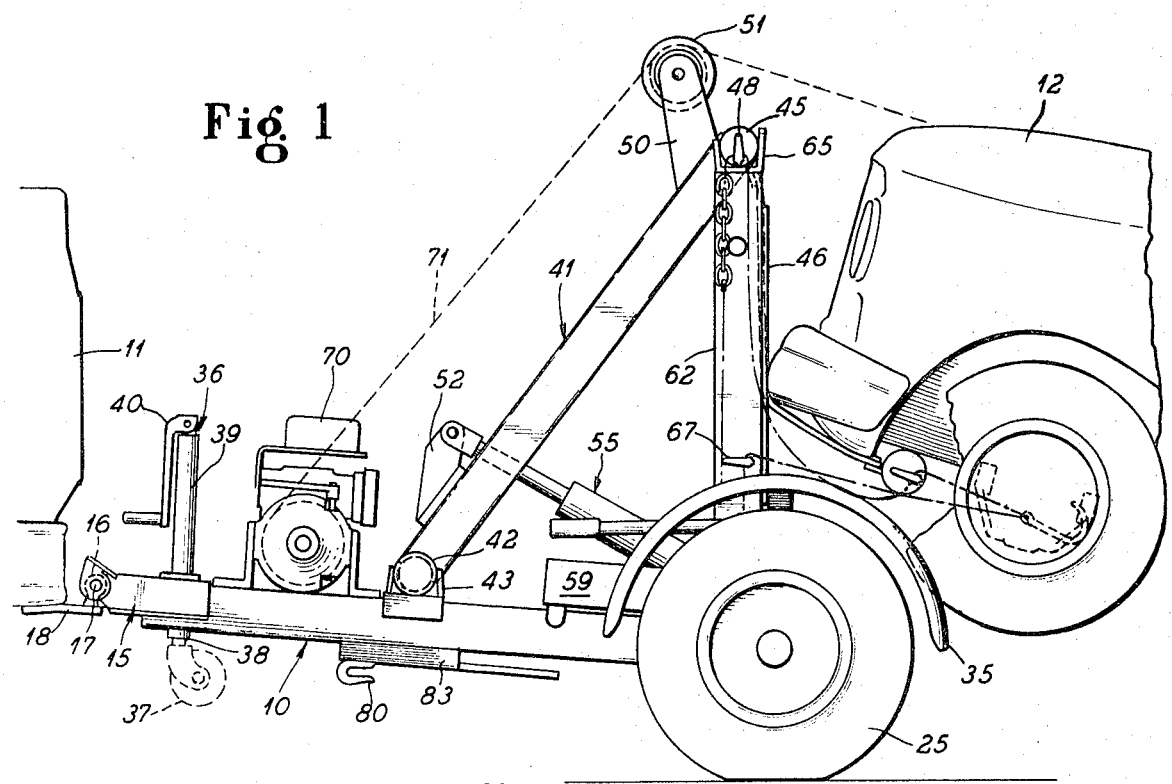
Fig. 10
Fig. 3
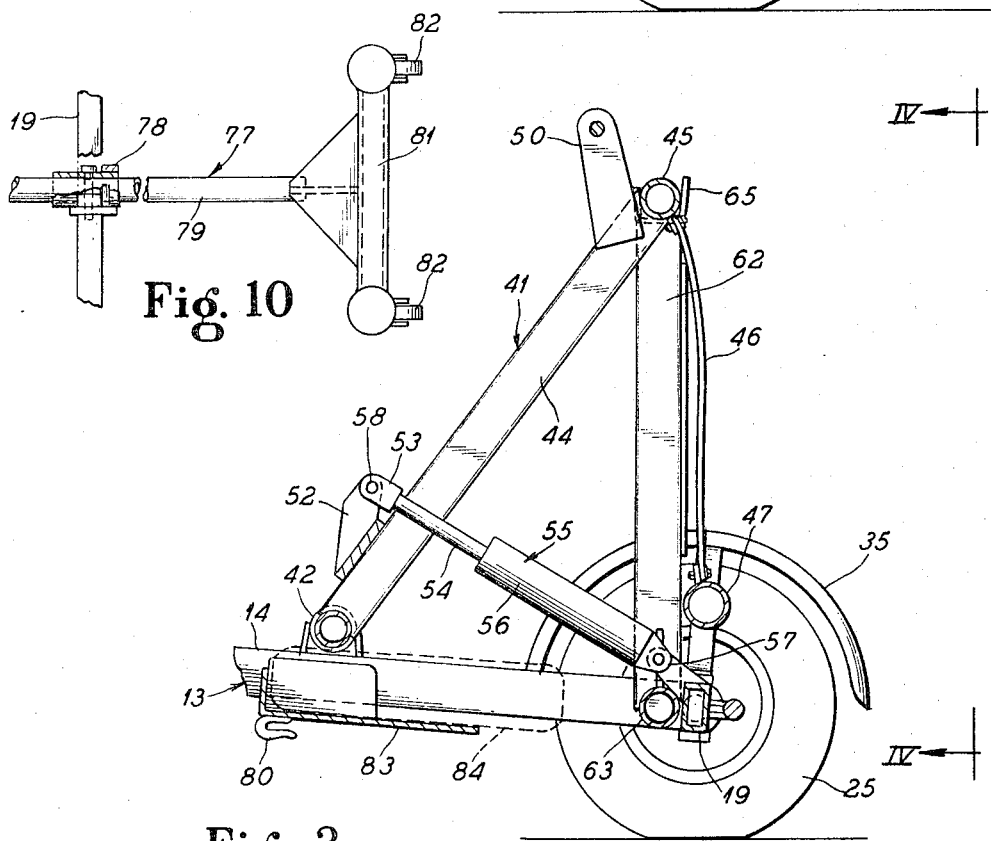

TOW TRAILER FOR VEHICLES

BACKGROUND OF THE INVENTION

This invention relates to the art of towing vehicles with standard automobiles or trucks enabling garages, service stations and the like to render towing service without investing in large cumbersome and expensive wrecker equipment. Specifically the invention deals with a self-contained independent tow trailer unit with two interconnected self-tracking wheels, cable winch equipment, hydraulic lift equipment, suspension equipment for cradling one end of the vehicle to be towed in fixed snubbed relation so that the wheels on the other end of the vehicle will ride the roadbed and cooperate with the self-tracking trailer wheels to follow the towing vehicle.

PRIOR ART

Vehicle hoisting and towing vehicles are known in the prior art as for example in the Barhorst U.S. Pat. No. 2,553,229, dated May 15, 1951 and the LaLonde U.S. Pat. No. 2,808,160, dated Oct. 1, 1957. Such vehicles, however, suspended the raised end of the disabled vehicle from its bumper and were incapable of snuggly locking the disabled vehicle to the unit. These prior known towing units frequently caused further damage to the disabled vehicle as by bending and breaking the bumper suspensions and accommodated swaying of the disabled vehicle to such an extent as to be unsafe for travel at any appreciable speed.

SUMMARY OF THE INVENTION

This invention now avoids the deficiencies of the prior art in providing a self-contained independent tow unit for ready attachment to a conventional truck or trailer to suspend one end of a towed vehicle in fixed locked relation thereon without transferring the weight of the towed vehicle to the towing automobile or truck. The mechanism for suspending the one end of the towed vehicle includes a swingable frame which suspends belts that wrap around the end of the towed vehicle to be lifted and cooperate with chains hooked to the towed vehicle to form a sling suspension connection which will not accommodate relative movement between the tow unit and the towed vehicle.

A feature of the tow trailer unit of this invention is its ability to "self-track" in following the towing vehicle. Thus the dirigible wheels of the unit will follow the direction of travel of the towing unit without any positive steering linkage connection between the towing vehicle and the tow trailer.

In a modified embodiment positive steering of the tow trailer unit is provided for by a lever arm connection between the towing vehicle and a steering bell crank on the tow trailer unit.

Another important feature of this invention is the swingable lift frame which suspends the cradling belts for wrapping around the lifted end of the vehicle.

Another feature of the invention is the provision of swingable struts on the tow vehicle to cooperate with the lift frame for locking the same in an upright position.

A further feature of the invention is the provision of chain anchors to cooperate with the belts for tightly cradling the towed vehicle as the lift frame is operated.

A still further feature of the invention is the provision of simplified attachments for the tow trailer to convert the same into a lifting derrick.

An object of the invention is to provide a completely independent self-contained tow vehicle for attachment to conventional automobiles or trucks to suspend and tow vehicles without the requirement of expensive, cumbersome wrecking trucks.

Another object of the invention is to provide a tow trailer unit which has a swingable frame suspending flexible belt supports and chains to cradle one end of a vehicle in fixed relation on the rear end of the unit.

A further object of the invention is to provide locking struts for the lift frame of a tow unit which will rigidify the lift frame with the main frame of the unit and relieve stress from hoisting mechanism.

A further object of the invention is to provide a complete independent tow vehicle having a triangular main frame or chassis with a coupling hitch at the apex thereof, a pair of dirigible wheels at the rear end thereof, lift mechanism swingable on the frame from a lowered rearwardly projecting position to an upright position and locking struts swingable on the frame to hold the lift mechanism in an upright position.

A specific object of the invention is to provide a complete independent tow vehicle unit with attachments for converting it to a lifting derrick.

Other and further objects of this invention will become apparent to those skilled in this art from the following detailed description of the annexed sheets of drawings which by way of a preferred example illustrate one embodiment of the invention.

ON THE DRAWINGS

FIG. 1 is a side elevational view of the tow trailer unit of this invention illustrating the manner in which it is coupled to a towing vehicle and suspends the front end of a vehicle in fixed cradled relation;

FIG. 3 is a vertical cross sectional view of a portion of the unit of FIGS. 1 and 2 taken along the line III—III of FIG. 2;

FIG. 10 is a fragmentary plan view taken generally along the line X—X of FIG. 9;

AS SHOWN ON THE DRAWINGS

As shown in FIG. 1 the tow trailer unit 10 of this invention is coupled to the rear end of a towing truck 11 and suspends the front end of a second vehicle 12.

Figure 2:
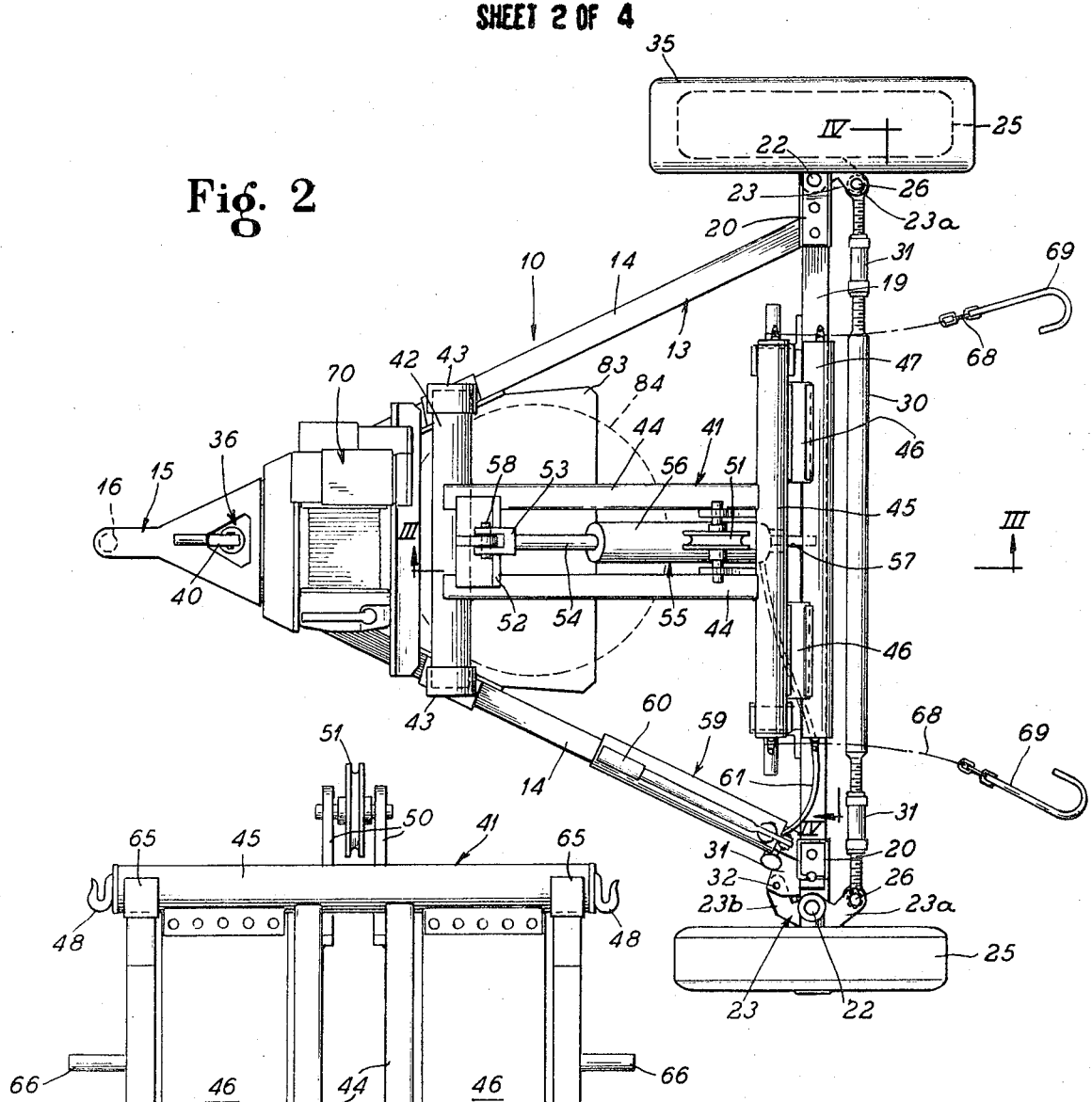
FIG. 2 is a plan view of the tow vehicle unit of FIG. 1.
Figure 4:
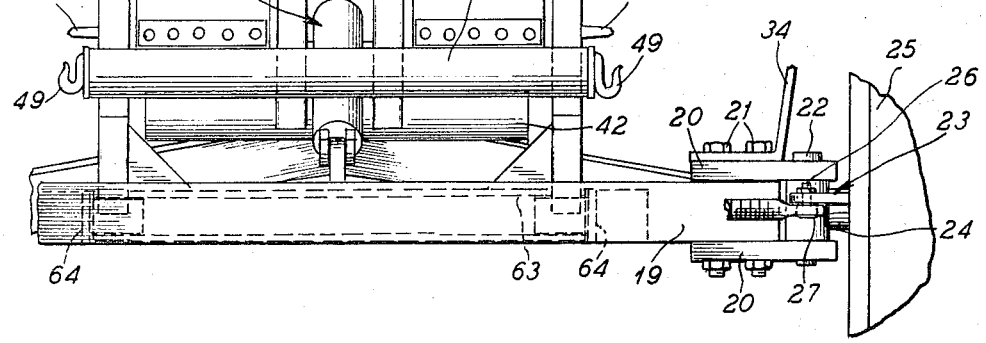
FIG. 4 is a fragmentary rear end elevational view of the tow trailer unit taken along the line IV—IV of FIG. 3 and with parts omitted.

The unit 10 as shown in FIGS. 1 and 2 has a triangular main frame or chassis 13 with side frames 14, 14 converging to a conventional trailer hitch 15 with a ball socket 16 at the apex thereof adapted to receive a ball stud 17 carried on a bracket 18 projecting from the rear end of the towing vehicle 11. The divergent ends of the side frames 14, 14 are connected by a transverse rear end frame 19. The outer ends of the frame 19 have blocks 20 extending from the top and bottom faces thereof as shown in FIG. 4 and securely bolted to the frame by through-bolts 21. The top and bottom blocks at each end of the frame 19 carry a kingpin 22 which pivotally supports a wheel knuckle 23 having a spindle axle 24 projecting outwardly therefrom and rotatably supporting a rubber-tired wheel 25.

The knuckles 23 have rearwardly projecting arms 23a (FIG. 2) to which are secured the studs 26 of ball and socket joints 27 carried on the ends of a tie rod 30 with a length adjustable turnbuckle 31 at each end thereof. Thus, the knuckles 23 must pivot in unison on their respective kingpins 22, being connected by the tie rod 30.

The front end of one knuckle 23 as shown in the bottom of FIG. 2 has an extension 23b underlying a bracket 31 on the frame 19 and a pin 32 locks this wheel knuckle fixedly to the bracket 31 to prevent pivoting thereof about the kingpin 22. This lock is positioned so that the wheels 25 will be held in a straight-ahead position as viewed in FIG. 2. When the pin 32 is removed, however, the wheels 25 are free to pivot on their kingpin axes but must move in unison because they are coupled by the tie rod 30.

The kingpin 22 is inclined in such a way as to provide a caster trailing effect for the wheels which will cause them to follow the towing vehicle 11. In addition the kingpins are inclined so that as the wheels 25 are turned from their straight-ahead position the frame 13 will be lifted. Caster, camber and tow-in adjustments are provided on the wheel suspensions causing them to be self-tracking to follow the towing vehicle especially when the weight of the towed vehicle is supported by the tow unit. The attachment of the towed vehicle to the tow unit providing, as it does, a four-wheeled trailer including the two wheels of the tow unit and the two wheels of the towed vehicle and adding the weight of the towed vehicle to the towing unit creates a dynamic stability which causes the wheels of the towing unit to be self-tracking in following the towing vehicle.

As also shown in FIG. 4 the mounting bolts 21 for the blocks 20 can also support a fender bracket 34 to carry a fender 35 over each wheel 25.

From the above description it will be apparent that the main frame or chassis 13 of the vehicle 10 is supported on a pair of self-tracking dirigible wheels connected by a tow rod for turning in unison. The front end of the frame is supported from the towing vehicle on a conventional trailer hitch. In addition, however, a retractable caster wheel suspension 36 is provided on the trailer hitch frame 15 at the apex of the main frame 13.

As shown, this device includes a caster wheel 37 swivelly supported from a screw rod 38 depending from a housing 39 and actuated by a handle 40 to be raised and lowered so that the caster wheel 37 may rest on the ground and cooperate with the wheels 25 to support the unit or may be raised to an out-of-the-way position when the unit is coupled to the towing vehicle.

A lifting frame 41 has a transverse supporting axle 42 on the lower end thereof rotatably mounted in bearings 43 carried on the tops of the side frames 14, 14 forwardly from the midpoints of these frames so that the weight of the lift frame 41 is carried well forwardly from the wheels 25. The frame 41 has spaced parallel arms 44, 44 secured at their lower ends as by welding to the central portion of the axle 42 and at their upper ends to a rigid cross tube 45 which is longer than the axle 42.

A sling for cradling the towed vehicle is provided by a pair of tough strong belts 46, 46 suspended in spaced side-by-side relation from the cylinder 45 and in turn support a second cylinder 47 at their bottom ends. The belts 46 are shorter than the arms 44 so that the cylinder 47 will hang from the belts at a level above the main frame when the lift frame 41 is in its upright position as shown in FIG. 4. The belts can be composed of rubber or plastic impregnated fabric and are sufficiently flexible so that the cylinder 47 can readily swing relative to the cylinder 45. Some degree of elasticity may be desirable in the belts but they should not stretch freely. As will be more fully hereinafter described the belt suspension provides slings to cradle the lifted end of the towed vehicle.

Upwardly opening hooks 48, 48 are provided at the ends of the cylinder 45 and similar hooks 49, 49 are provided at the ends of the cylinder 47 for a purpose to be more fully hereinafter described.

The upper ends of the arms 44 have brackets 50 extending upwardly and rearwardly therefrom and supporting a rotatable cable sheave 51. A bracket 52 is secured on the arms 44 near the axle 42 and spans the space between the arms to receive a clevis 53 on the end of the piston rod 54 of a hydraulic jack 55 having its housing 56 pivoted to a bracket 57 carried by the rear frame 19. A pin 58 removably connects the clevis 53 with the bracket 52 so that the hydraulic jack 55 can be uncoupled from the lift frame 41 if desired.

A hydraulic pump 59 is mounted on top of one of the frames 14 near the rear end thereof and is manually actuated from a handle 60 to pump fluid through a tube 61 to the lower end of the cylinder 56 of the hydraulic jack 55 for raising the piston in the cylinder to eject the piston rod 54 for swinging the lift frame 41 about its axle 42. In this manner the lift frame 41 may be swung from the position shown in FIG. 5 to the position shown in FIG. 6 lifting the front end of the vehicle 12.

A pair of rigid struts 62, 62 are welded at their bottom ends to a tube 63 as shown in FIGS. 3 and 4 which tube in turn is rotatably mounted between bearing brackets 64 carried by the rear frame 19. The struts 62 are spaced apart and are positioned so that open-topped recesses on the free ends of the struts will receive the cylinder 45 near the ends thereof.

A laterally projecting handle 66 is provided on each strut 62 to be manually grasped for swinging the struts about their pivots 64. The struts thus swing from a lower position shown in FIG. 5 to an upright position shown in FIG. 6 where they are about to receive the cross cylinder 45 of the lift frame 41. The pivot connections 64 for the struts 62 are relatively tight so that a manual effort is needed to swing the struts from any given position.

As shown in FIGS. 1 and 4 the outboard faces of the struts 62 carry rearwardly opening chain hooks 67, 67 near the bottom ends thereof for a purpose to be more fully described.

A heavy link chain 68 is draped over the lift frame 41 to span the cylinder 45 thereof and has the links thereof suspended from the open top hooks 48. The chain is sufficiently long so that its end portions depending from the hooks 48 may extend to the hooks 49 and appreciably therebeyond to receive detachable vehicle hooks 69 and then have sufficient lengths beyond these hooks to be attached back to the strut hooks 67.

Figure 5:
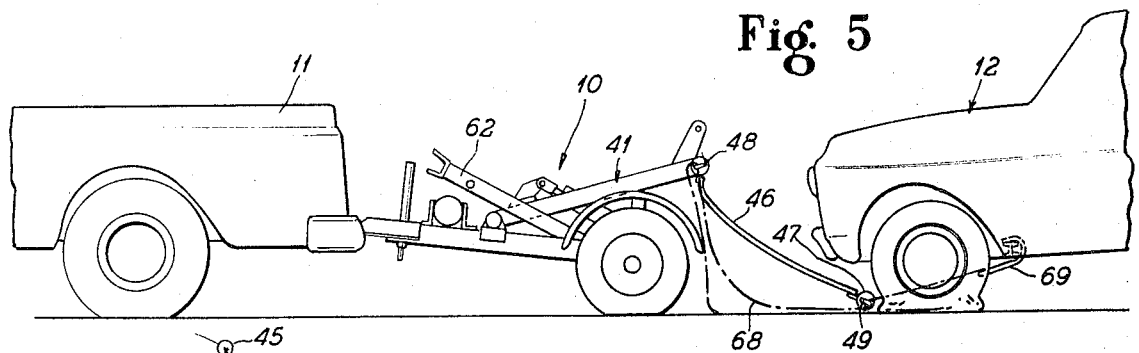
FIG. 5 is a view similar to FIG. 1 but showing the lifting frame of the unit in a lowered position for receiving the front end of the vehicle to be transported.

As shown in FIG. 5, when the lift frame 41 is in its lowered position the suspended cylinder 47 on the belts 46 is moved to a position closely adjacent the wheels of the vehicle. The chain 68 anchored in the top hooks 48 then has a limp length extending to the hooks 49 in the ends of the cylinder 47. The chain then extends to the vehicle hooks 69 which are secured to a link in the end portions of the chain but spaced from the ends of the chain. The hooks 69 are then anchored to a cross frame of the vehicle or to the front wheel suspension pads of the vehicle. Then when the lift frame 41 is raised by the hydraulic jack 65 to the position of FIG. 6, the length of chain between the hooks 69 and the tube 47 will pull this tube under the bumper of the car closely adjacent to the wheels. At the same time the belts 46 are lifted to cradle the front end of the vehicle on the belts. In this position the length of the chain between the hooks 69 and the strut hooks 67 remains somewhat limp, although it is desired to pull these chain lengths rather taut as the vehicle 12 is snugged into the belts.

Figure 6:
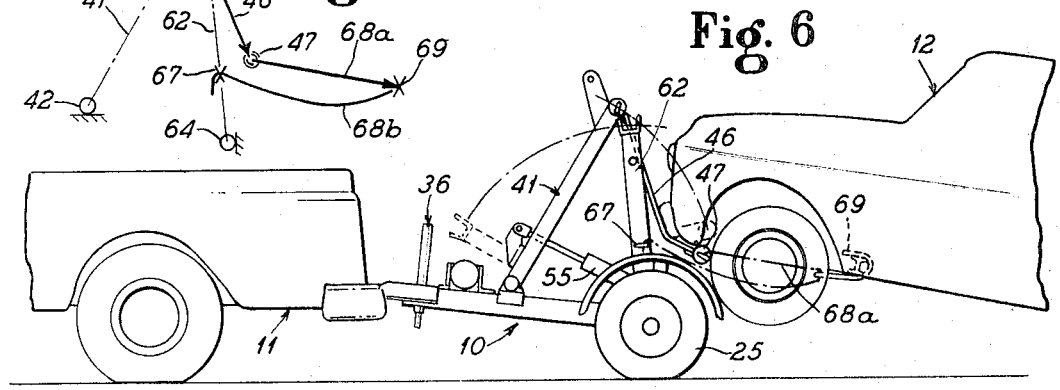
FIG. 6 is a view similar to FIG. 5 but illustrating the positions of the lift frame components just prior to receiving the locking struts.

Next, as the lift frame 41 is lowered from the position of FIG. 6 to the position of FIG. 1 where the upper ends of the struts 62 will receive the frame cylinder 45, the vehicle will slide somewhat downwardly on the belts 46 tightening the chain lengths between the hooks 69 and 67. This tightening of these chain lengths provides a direct pull connection between the vehicle and the tow trailer.

Figure 7:
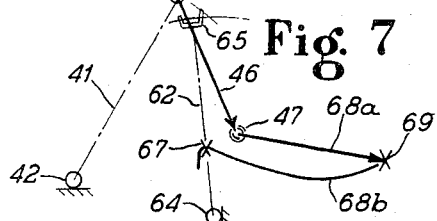
FIG. 7 is a force diagram illustrating the loading of the components in the position of FIG. 6.
Figure 8:
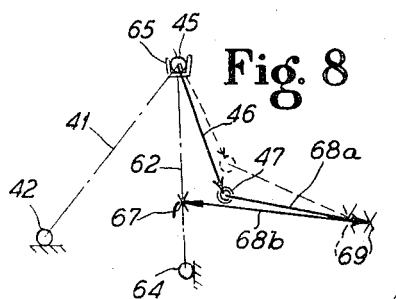
FIG. 8 is a diagram similar to FIG. 7 illustrating the loading of the components in the locked position of FIG. 1.

FIGS. 7 and 8 diagrammatically illustrate the manner in which the tow unit of this invention cradles the towed vehicle into snug fixed relation therewith. As shown in FIG. 7 when the belt cylinder 47 is raised to the position as shown by the lift frame 41 being raised above the receptacles 65 of the struts 62, the chain lengths 68a between the hooks 49 on the cylinder 47 and the anchor hooks 69 will be tight while the chain lengths 68b between these hooks 69 and the hooks 67 of the strut arms 62 will be loose. In this position, the chain lengths 68b are manually tightened but since they are not bearing any load they may be considered "loose."

Then, as shown in FIG. 8, when the lift frame 41 is lowered to seat the cylinder 45 into the receptacle 65 on the top of the strut arm 62, the belt suspended tube 47 will drop from the dotted line position to the solid line position permitting the front end of the car to lower somewhat and move backward so that the hooks 69 will shift from the dotted line to the solid line position. This of course tightens the chain length 68b so that it will cooperate with the tightened chain length 68a to form the direct pulling chain for the vehicle. At the same time these tightened chains cradle the front end of the vehicle on the belts 46. It should be appreciated that in the operation as described the chain length 68 from the frame cylinder 45 to the frame cylinder 47 will remain somewhat loose and will function as a safety chain backing up the belt 46. The chain length 68a from the cylinder 47 to the hooks 69 is taut and provides a primary suspension connection holding the car body against the belts. The chain length 68b, which may be a separate chain and which extends from the hooks 69 to the hooks 67 of the strut arms varies between a loose condition as illustrated in FIG. 7 and a tight condition as illustrated in FIG. 8. In the position illustrated in FIG. 8 the chain lengths 68b function as a towing connection preventing rearward swaying of the towed vehicle with respect to the tow unit.

An electric motor driven winch 70 is mounted on the main frame 13 rearwardly of the hitch frame 15. This winch can be driven from batteries on the tow unit 10 itself or can be connected to the batteries of the towing vehicle 11. A cable 71 from the winch is trained over the sheave 51 and can be fastened to the vehicle 12 to pull it out of a ditch or to draw it closely to the tow vehicle for mounting on the tow vehicle.

Figure 9:
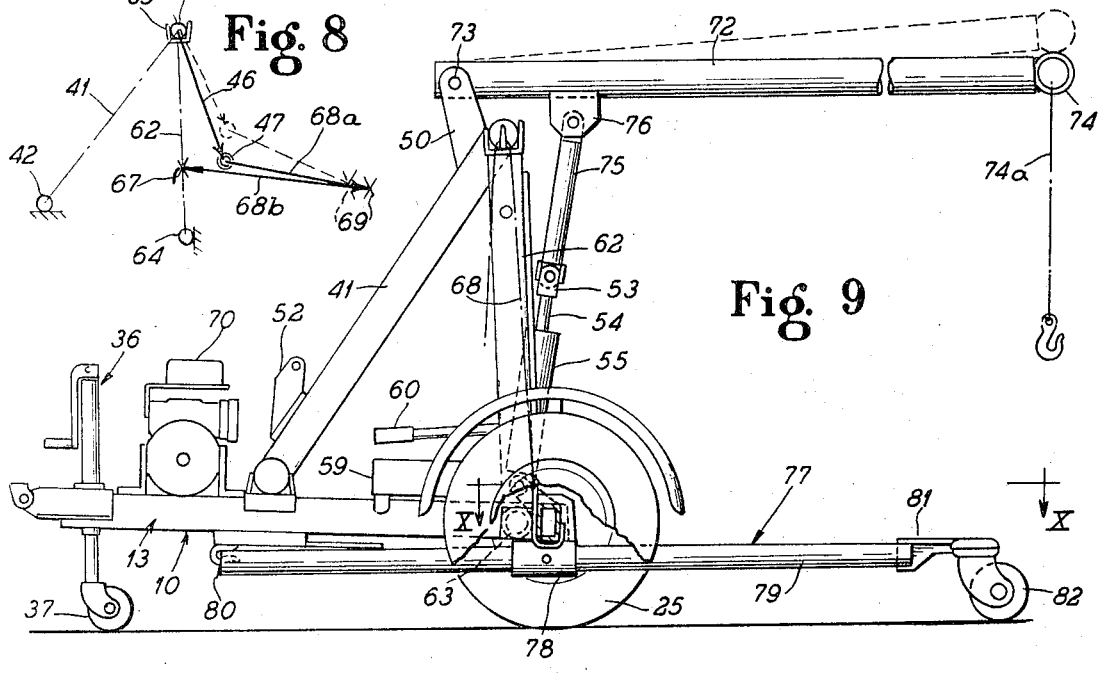
FIG. 9 is a side elevational view of the tow trailer unit equipped with the attachments for providing a lift derrick.

As shown in FIGS. 9 and 10 the tow vehicle unit 10 of this invention is easily and quickly converted into a lifting crane by replacing the sheave 51 carried by the brackets 50 with a boom 72 pivoted at 73 to these brackets 50. The front end of the boom may be equipped with an attachment member 74 for attaching a lifting chain 74a.

The clevis 53 on the piston rod 54 of the hydraulic jack 55 is uncoupled from the bracket 52 on the lift frame 41 and is coupled to a strut tube 75 which is pivoted to a bracket 76 mounted on the bottom of the boom 72 closely adjacent the pivot 73. It is thus seen that actuation of the pump 59 to extend the hydraulic jack 55 will raise the boom 72 about its pivot 73.

To provide stabilizing ground support for the boom 72, an auxiliary frame 77 is carried by the underside of the main frame 13 in a horizontal tubular bracket 78 mounted under the frame beam 19 at the midpoint thereof. The auxiliary frame 77 includes a tube 79 slidable through the bracket 78 and retained at its inner end, as shown in FIG. 9, in a clip 80 mounted under the frame 13. The outer end of this tube 79 has a cross frame 81 on the ends of which caster wheels 82 are suspended. This frame 77 provides support and stability for the derrick adaptation of the vehicle 10 of this unit. The frame 77 can be removed or can be stored underneath the frame 13 as desired.

It will be understood that the lift frame 41 is locked and stabilized by the struts 62 to cooperate therewith and with the main frame 13 to form a triangular rigid base for the lift apparatus. It will be appreciated that the struts are manually swingable into upright position for receiving the tubular end 45 of the lift frame 41 and to a substantially horizontal out-of-the-way position as shown in FIG. 5 when the lift frame is in its lowered position. The struts eliminate any hazards that might be involved in a hydraulic lift system because they lock the lift frame in a fixed position once the towed vehicle is anchored to the tow unit.

If desired, the frame 13 may also suspend a tire rack 83 for a spare tire 84 as shown in FIGS. 2 and 3.

Figure 11:
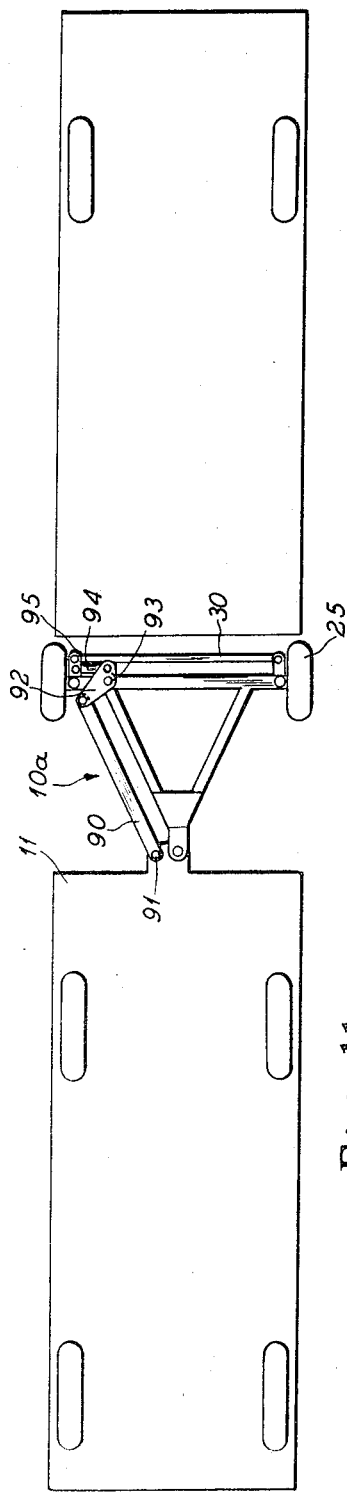
FIG. 11 is a schematic top view of a towed vehicle and towing vehicle connected by a modified form of the tow trailer unit of this invention equipped for positive steering.
Figure 12:
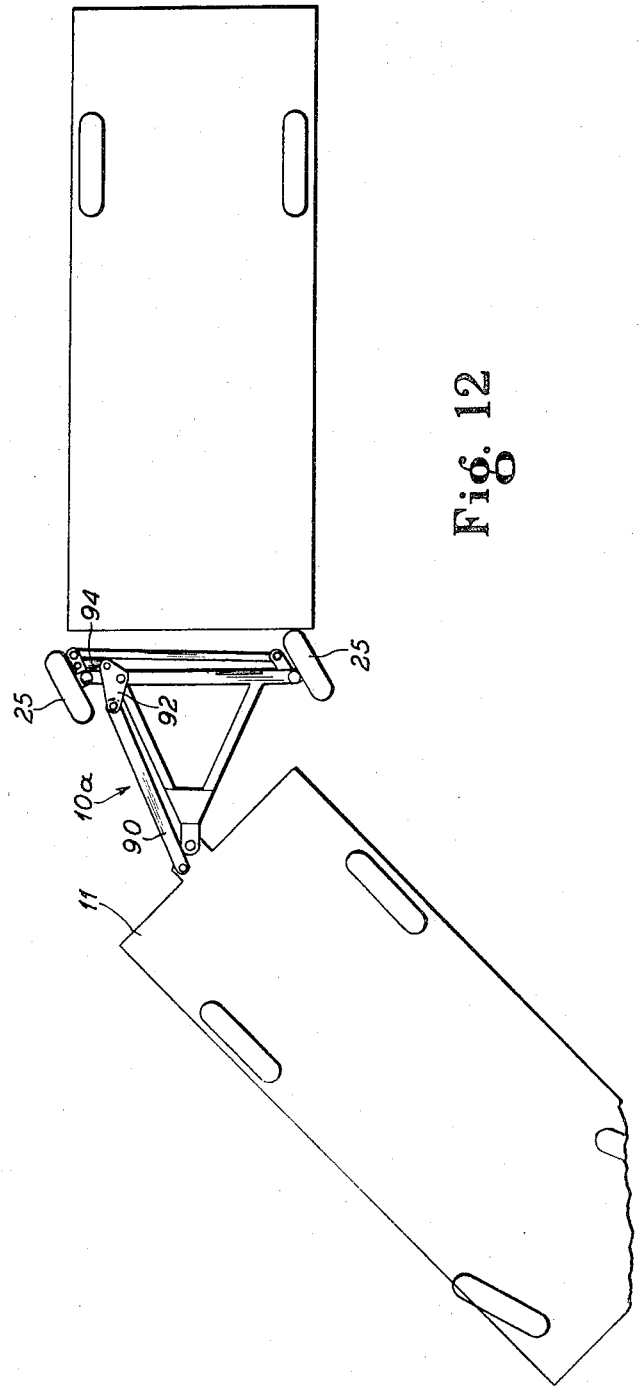
FIG. 12 is a view similar to FIG. 11 illustrating the positive steering of the modified tow trailer unit of this invention.

FIGS. 11 and 12 illustrate a modified form of the tow trailer unit 10a of this invention. The tow trailer unit 10a is equipped with a lever 90 extending between a connection point 91 on the towing vehicle 11 and a bell crank 92 pivoted as at 93 to the tow trailer unit frame. The bell crank is in turn pivotally connected to a steering lever 94 which is attached to the tie rod 30 through a connecting link 95. Therefore, as illustrated in the difference between FIGS. 11 and 12 as the towing vehicle 11 turns movement of the lever 90 relative to the frame of the tow unit will cause the bell crank to rotate on the pivot connection 93. This will move the lever 94 so as to cause a turning of the dirigible wheels 25 to follow the towing vehicle 11. This modification provides for positive steering of the tow trailer unit.

Although a single chain length has been described for anchoring the towed vehicle to the lift mechanism and tow vehicle, it will be understood that two separate chain lengths can be used, one of each side of the lift frame.

It will also be understood that any departures from the showings of the drawings may be made without departing from the scope of the invention.

I claim as my invention:

1. A self-contained independent tow trailer unit for coupling with a conventional automobile or truck vehicle to safely suspend and transport towed vehicles which comprises a main frame, a trailer hitch on the front end of the main frame, wheels on the rear end of the main frame supporting the frame above the ground, a lift frame pivoted on said main frame, a transversely extending cross member rigidly secured on the free end of said lift frame, slings suspended from the cross member of said lift frame for cradling a towed vehicle, anchor chains attached to said unit for locking said towed vehicle in said slings, means for swinging said lift frame from a lowered rearwardly extending position to an upright position on said main frame, and struts pivoted on said main frame rearwardly from the lift frame releasably receiving outer end portions of said cross member of the lift frame to cooperate with the lift frame and main frame in forming a rigid triangular structure locking the lift frame in fixed upright position on the main frame.

2. A self-contained self-tracking towing trailer unit for coupling to the rear end of a towing vehicle and for supporting one end of a towed vehicle which comprises a main triangularly shaped frame, a trailer hitch at an apex of said frame, dirigible wheels suspended from the other apices of the main frame, a tie rod connecting said dirigible wheels for co-movement, a lift frame pivoted on said main frame, a hydraulic jack for swinging said lift frame about its pivot mounting, a manually actuated pump on the main frame for operating the hydraulic jack, towed car slings suspended from the free end of the lift frame, chains cooperating with said slings and suspended from the lift frame for anchoring one end of a towed vehicle in the slings, and locking strut means pivoted on the main frame rearwardly from the pivoted end of the lift frame having free ends selectively and releasably receiving the free swinging end of the lift frame to support the lift frame and form with the lift frame and main frame a rigid triangular structure anchoring the lift frame in fixed upright position on the main frame.

3. A trailer unit adapted to suspend one end of a towed vehicle and be towed from a conventional vehicle which comprises a two-wheeled chassis unit, a lift frame swingably mounted on said unit from a rearwardly extended lower position for anchoring one end of a towed vehicle to an upright position for cradling said end of the towed vehicle, and laterally spaced strut arms pivoted on the main frame in rearwardly spaced relation from the lift frame having free swinging ends with receptacles selectively and releasably receiving outer end portions of the free swinging end of the lift frame to cooperate therewith and with the frame to form a triangular rigid support for the towed vehicle.

4. A tow device for towed vehicles which comprises an independent trailer unit having a main chassis, a pair of support wheels, and a trailer hitch, lift mechanism on the main frame, winch mechanism on the main frame, a pair of strut arms swingable on the main frame, each having an open topped receptacle on the swinging end for receiving the lift mechanism in upright position on the main chassis for locking the lift mechanism, and sling means on the lift mechanism adapted to be anchored to one end of a car for cradling said end in a raised position on the unit.

5. The trailer unit of claim 1 wherein the wheels on the rear end of the main frame are self-tracking dirigible wheels and a tie rod connects said dirigible means for co-turning movements.

6. The unit of claim 1 including hooks on the struts for locking anchor chain lengths extending between towed vehicle engaging hooks and the strut hooks.

7. The unit of claim 1 wherein the lift frame has a first pair of hooks on the sides of the swinging end thereof and a second pair of hooks is provided on the slings and a safety chain extends therebetween.

8. The unit of claim 1 wherein hooks for the anchor chains are provided on the sides of the struts near the strut pivots.

9. A self-contained independent tow trailer unit for coupling with a conventional automobile or truck vehicle to safely suspend and transport towed vehicles which comprises a main frame, a trailer hitch on the front end of the main frame, wheels on the rear end of the main frame supporting the frame above the ground, a lift frame pivoted on said main frame, a boom pivoted on the swinging end of the lift frame, slings suspended from the lift frame for cradling a towed vehicle, anchor chains attached to said unit for locking said towed vehicle in said slings, means for swinging the lift frame from a lowered rearwardly extending position to an upright position, and struts swingable on the main frame releasably receiving said lift frame to lock the lift frame in a fixed, upright position.

10. The unit of claim 9 including an auxiliary frame adapted to be extended rearwardly from the main frame to afford additional support for loads carried by said boom.

11. The unit of claim 2 wherein the chains are anchored to the swinging end of the lift frame, to the free ends of the slings suspended from the lift frame and to the strut means.

12. The unit of claim 3 wherein the two wheels are self-tracking.

13. The tow device of claim 4 wherein the lift mechanism includes a swinging frame suspending the slings and a hydraulic jack for swinging the frame from a lowered rearwardly extending position to an upright position, and the open topped receptacles on the arms are in the free ends of the arms and receive the swinging end of the lift frame when it is in the upright position on the main chassis.

14. The tow device of claim 4 wherein the lift mechanism includes a swinging frame with a support on the swinging end thereof adapted to selectively receive a cable sheave or a derrick boom, and said winch mechanism feeds a cable to said sheave.

15. The tow trailer unit of claim 1 wherein the wheels are attached to the main frame through pivotal attachments allowing steering of the wheels and a steering linkage is attached between the wheels and the conventional automobile or truck vehicle to provide for positive steering of the wheels of the tow trailer unit in following the conventional automobile or truck vehicle.

* * * * *